Jan. 8, 1952     T. A. RICH ET AL     2,582,163
ELECTROMETER FOR POCKET CHAMBERS
Filed June 7, 1949
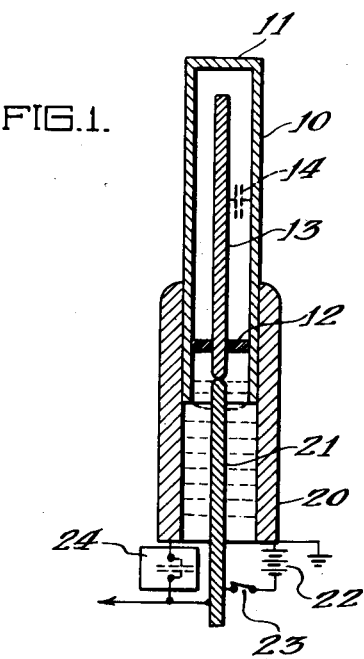
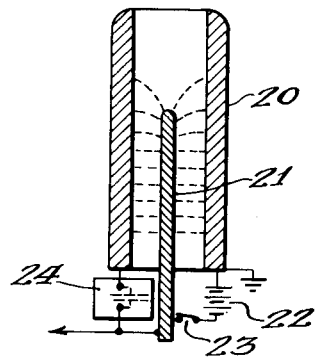
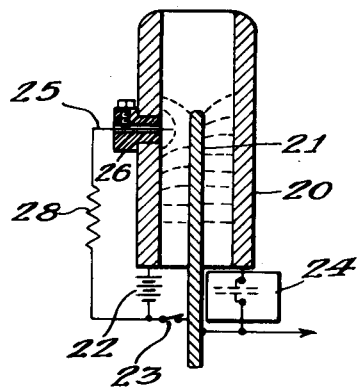
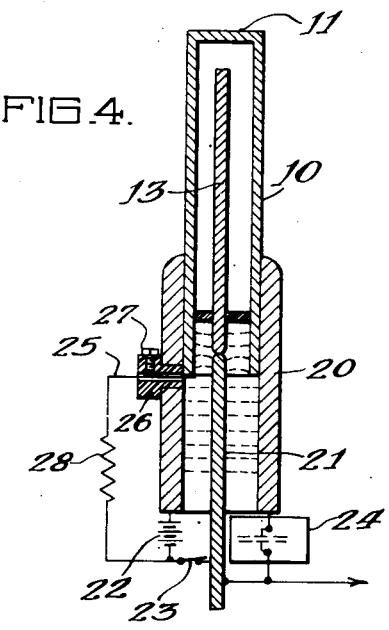
INVENTORS:
Theodore A. Rich
BY John E. Bigelow
Roland A. Anderson
Attorney Patented Jan. 8, 1952

2,582,163

UNITED STATES PATENT OFFICE 2,582,163

ELECTROMETER FOR POCKET CHAMBERS

Theodore A. Rich and John E. Bigelow, Schenectady, N. Y., assignors, by mesne assignments, to the United States of America as represented by the United States Atomic Energy Commission Application June 7, 1949, Serial No. 97,657

5 Claims. (Cl. 313—93)

1

The present invention relates generally to radiation detection and measuring apparatus and more particularly to improved apparatus for charging and/or measuring the charge of a portable ionization type radiation meter.

Pocket radiation meters or ionization chambers of the portable type generally referred to above are known in the art and examples of two specific forms of such pocket ionization chambers are described in detail in the copending patent applications of John E. Rose et al., Serial No. 713,654, filed December 3, 1946, and Louis A. Pardue et al., Serial No. 617,129, filed September 18, 1945, now Patent No. 2,536,991. Such pocket chambers may be briefly described as comprising a cylindrical ionization chamber of pencil dimensions which is either provided with an inherent capacitative voltage source to be charged or is provided with an auxiliary capacitance voltage source to be charged in parallel with the ionization chamber. Since the presence of radioactivity will cause ionization in the chamber, the stored charge in the capacitance voltage source will be discharged through the ionization chamber and the amount of discharge will be proportional to the amount of radioactivity to which the ionization chamber has been exposed. Thus, workers in radioactive areas may be provided with initially charged pocket chambers at the beginning of their day's work and the charge remaining in the pocket chamber at the end of the day's work will be an indication of the amount of radioactivity to which the worker has been exposed.

In the prior art apparatus, a charging socket, in which the radiation pencil may be inserted, has been employed to connect the capacitance of the pocket chamber to an external source of charging voltage and/or a charge measuring device such as an electroscope. Prior to this invention, the charging sockets were comprised of a cylindrical outer socket element in which the outer cylindrical electrode of the pocket chamber could be inserted to be connected to one terminal of the charging voltage source. A rod electrode was coaxially positioned within the cylindrical charging socket to contact the inner rod electrode of the pocket chamber and thus connect it with the other terminal of the external charging source. Switching means were provided to disconnect the external charging source while the pocket chamber was inserted in the charging socket so that any existing charge on the pocket chamber could be measured by an electroscope or the like which may be permanently connected in parallel with the inner and outer elements of the charging socket.

The usual method of operating such charging and charge measuring apparatus for pocket chambers as described above to determine the amount of radioactivity to which the chamber has been exposed is to insert the chamber in the socket and note the indicated charge on the electroscope. Such notation is facilitated by determining the initial full charge on the pocket chamber before exposure to radioactivity to give a reading on the electroscope calibrated at zero. Therefore, to initially charge the pocket chamber, the switch is closed to connect the charging source simultaneously in parallel with the capacitance of the pocket chamber and the electroscope. The indication of the electroscope at that time is calibrated as the zero reading position. After the pocket chamber has been used, it is reinserted in the charging socket with the external voltage source disconnected, and the remaining charge is distributed to the electroscope whose variation from zero reading is an indication of the amount of discharge through the ionization chamber. It has been found that, when employing the simple charging socket arrangement of the prior art, the calibrated zero reading position of the electroscope is changed upon insertion or removal of the pocket chamber from the charging socket due to a redistribution of charge along the surfaces of the charging socket elements including the inner rod and outer cylindrical electrodes and to a change of capacitance of the charging socket when the pocket chamber is either inserted or removed. This is particularly objectionable when the charging and measuring apparatus is being used to first measure the residual charge after use and thereafter recharge a large number of pocket chambers in rapid succession.

It is therefore a principal object of this invention to provide an improved charging socket for pocket chambers having means to compensate for the redistribution of charge and change of capacitance by the removal or insertion of the pocket chamber from the charging socket so as to minimize the change of indication of a charge measuring device connected in parallel therewith when the pocket chamber is inserted or removed.

Other objects and advantages of the invention will be apparent with reference to the following specifications and drawing in which:

Figs. 1 and 2 are diagrammatic illustrations of the prior art form of pocket chamber charging socket with the pocket chamber inserted and removed respectively to show the distribution of the lines of force under both conditions;

Figs. 3 and 4 are diagrammatic illustrations of the improved form of pocket chamber charging socket of this invention with the pocket chamber removed and inserted respectively and also showing the changed distribution of the lines of force.

An ionization chamber of the pocket type is generally shown in both Figs. 1 and 4 of the the drawing and will be briefly described with specific reference to the structure adapted to cooperate with the pocket chamber charging socket of this invention. The pocket chamber may be comprised of a cylindrical can or outer electrode 10 of suitable conducting material such as aluminum. The outer electrode 10 is provided with an integral end structure 11 at one end and its other end is hermetically sealed by an insulating disk 12 of polystyrene or the like. An inner rod electrode 13 extends through the disk 12 in coaxial relation to the outer cylinder 10 and this inner rod may also be of suitable conducting material such as aluminum wire coated with collodial graphite. It will be noted that the outer electrode 10 extends beyond the end of the inner rod electrode 13 in order to shield the end of the electrode 13 and prevent accidental discharge of the chamber by an inadvertent short circuit between the ends of the respective electrodes. The pocket chamber thus formed may be filled with a suitable gas such as air at atmospheric or greater than atmospheric pressure. The inherent capacity of the pocket chamber is represented by the capacitor 14 shown in dotted lines. By connecting the ends of the respective electrodes 10 and 13 to a suitable external source of charging voltage, the pocket chamber will be provided with a stored charge to be discharged by ionization within the chamber in response to radioactivity.

The simple form of pocket chamber thus described is shown in Fig. 1 to be connected with a known form of charging socket and in Fig. 4 is shown to be connected with the novel charging socket of this invention. The previous form of charging socket as shown in Figs. 1 and 2 is comprised of an external cylindrical socket element 20 of conducting metal such as aluminum and a coaxially positioned internal rod element 21 which likewise is formed of an electrically conducting material such as aluminum wire. The charging socket elements may be maintained in the position shown by any suitable supporting arrangement (not shown in the diagrammatic figures of the drawing). The outer socket element has an internal diameter approximately equal to the external diameter of the pocket chamber outer electrode walls so as to permit a telescopic friction fit as shown in Fig. 1 with the outer electrode 10 electrically contacting the socket element 20 and the inner electrode 13 electrically contacting the inner socket element 21. The outer socket element 20 is grounded as shown and connected to the negative terminal of a battery 22 whose positive terminal is connected through a switch 23 to the inner socket element 21. Also connected in parallel with the inner and outer socket elements 21 and 20 is a charge measuring device such as an electroscope 24. Thus when the pocket chamber is inserted in the charging socket as shown in Fig. 1 the electroscope 24 will indicate the total charge distributed over the pocket chamber and charging socket elements, which charge distribution is shown by the lines of force on Fig. 1. When the switch 23 is closed, the total charge indicated by the electroscope will be that of the battery 22.

In accordance with a preferred operational procedure the electroscope is calibrated at zero position for such indication of total charge. As previously stated the lines of force shown in Fig. 1 are illustrative of the stress distribution when the pocket chamber is inserted in the charging socket and it will be noted that the capacitance of the charging socket is somewhat increased with the pocket chamber inserted due to the reduced distance to ground from the element 21 to both the element 20 and the internal end wall surfaces of the electrode 10. Furthermore, when the pocket chamber is removed from the charging socket after the battery has been disconnected as shown in Fig. 2, the lines of force distribution is changed to give a concentration of lines of force around the pointed end of the inner rod-like element 21 and this fringing flux is found to give an increase in capacity which overbalances the previously mentioned reduction in capacitance upon the removal of the pocket chamber to thus give an overall increase of capacitance for the charging socket which will absorb potential from the electroscope and cause the indication of the electroscope 24 to change from the previous calibrated zero position.

The improved charging socket of this invention as shown in Figs. 3 and 4 is modified to include means for automatically compensating the capacitance of the charging socket to be the same with the pocket chamber either inserted or removed therefrom. The elements of the charging socket shown in Figs. 3 and 4 which are the same as those shown in Figs. 1 and 2 will be given the same reference numerals and will not be further described. In addition, however, this invention provides for a third socket element 25 of rod-like form, to be adjustably inserted through the insulated bushing 26 in the side wall of the socket 20 in proximity to the end of the inner element 21. The element 25 may be fixed in the desired adjusted position by a setscrew 27 or the like. The third rod-like element 25 of the conducting material such as aluminum wire is connected through a high resistance current limiting resistor 28 to the positive terminal of the battery 22. Normally the potential of the third element 25 is the same as the inner element 21 and the interacting lines of force as shown in Fig. 3 are effective to reduce the capacity of the charging socket over what it would be if the third element 25 were not present, such as shown in Fig. 2. When the pocket chamber is inserted as shown in Fig. 4, the third element 25 contacts the end of the pocket chamber outer electrode 10 which is in contact with the grounded socket 20 to thus ground the third element 25 causing the lines of force to be redistributed as shown by Fig. 4 in comparison with Fig. 3 to thus increase the capacitance of the charging socket over what it would be without the third element as shown in Fig. 1. It should now be understood that by adjusting the position of the third element 25 towards or from the inner element 21, the capacitance of the charging socket can be adjusted to be the same with the pocket chamber either inserted or removed therefrom. Thus, spurious indications or kicks of the electroscope when the pocket chamber is inserted or removed in the charging socket while the external voltage source is disconnected will be eliminated and a more sensitive indication of the amount of radioactive exposure of the pocket chamber can be obtained.

We claim:

1. A charging socket for a pocket ionization chamber of the type including an outer cylindrical electrode and an inner coaxial rod electrode, said socket comprising a cylindrical socket element adapted to electrically contact the outer cylindrical electrode of said chamber when said chamber is inserted therein, an inner rod-like coaxial socket element adapted to electrically contact said inner rod electrode when said chamber is inserted therein, a third rod-like element extending in insulated relation through the wall of said cylindrical socket element in proximity to the end of said inner coaxial element, an external source of voltage whose positive and negative terminals are adapted to be connected through electrical switch means to the respective cylindrical element and inner coaxial element of the charging socket, said third element being connected to normally have the same potential as said inner coaxial element, and said third element further being positioned to contact the outer electrode of said chamber when said chamber is inserted in the charging socket to thus connect said third element to the potential of said outer cylindrical element.

2. A charging socket for a pocket ionization chamber of the type including an outer cylindrical electrode and an inner coaxial rod electrode, said socket comprising a cylindrical socket element adapted to electrically contact the outer cylindrical electrode of said chamber when said chamber is inserted therein, an inner rod-like coaxial socket element adapted to electrically contact said inner rod electrode when said chamber is inserted therein, a third rod-like element extending in insulated relation through the wall of said cylindrical socket element in proximity to the end of said inner coaxial element, an external source of voltage whose positive and negative terminals are adapted to be connected through electrical switch means to the respective cylindrical element and inner coaxial element of the charging socket, said third element being connected through a high resistance current limiting resistor to a terminal of said voltage source and normally have the same potential as said inner coaxial element, and said third element further being positioned to contact the outer electrode of said chamber when said chamber is inserted in the charging socket to thus connect said third element to the potential of said outer cylindrical element.

3. A charging socket for a pocket ionization chamber of the type including an outer cylindrical electrode and an inner coaxial rod electrode, said socket comprising a cylindrical socket element adapted to electrically contact the outer cylindrical electrode of said chamber when said chamber is inserted therein, an inner rod-like coaxial socket element adapted to electrically contact said inner rod electrode when said chamber is inserted therein, a third rod-like element extending in insulated relation through the wall of said cylindrical socket element in proximity to the end of said inner coaxial element, means to adjust the approximate position of said third element, an external source of voltage whose positive and negative terminals are adapted to be connected through electrical switch means to the respective cylindrical element and inner coaxial element of the charging socket, said third element being connected to normally have the same potential as said inner coaxial element, and said third element further being positioned to contact the outer electrode of said chamber when said chamber is inserted in the charging socket to thus connect said third element to the potential of said outer cylindrical element.

4. A charging socket for a pocket ionization chamber of the type including an outer cylindrical electrode and an inner coaxial rod electrode, said socket comprising a cylindrical socket element adapted to electrically contact the outer cylindrical electrode of said chamber when said chamber is inserted therein, an inner rod-like coaxial socket element adapted to electrically contact said inner rod electrode when said chamber is inserted therein, a third rod-like element extending in insulated relation through the wall of said cylindrical socket element in proximity to the end of said inner coaxial element, means to adjust the approximate position of said third element, an external source of voltage whose positive and negative terminals are adapted to be connected through electrical switch means to the respective cylindrical element and inner coaxial element of the charging socket, said third element being connected through a high resistance current limiting resistor to a terminal of said voltage source to normally have the same potential as said inner coaxial element, and said third element further being positioned to contact the outer electrode of said chamber when said chamber is inserted in the charging socket to thus connect said third element to the potential of said outer cylindrical element.

5. A charging and charge indicating socket for a pocket ionization chamber of the type including an outer cylindrical electrode and an inner coaxial rod electrode, said socket comprising a cylindrical socket element adapted to electrically contact the outer cylindrical electrode of said chamber when said chamber is inserted therein, an inner rod-like coaxial socket element adapted to electrically contact said inner rod electrode when said chamber is inserted therein, a third rod-like element extending in insulated relation through the wall of said cylindrical socket element in proximity to the end of said inner coaxial element, an external source of voltage whose positive and negative terminals are adapted to be connected through electrical switch means to the respective cylindrical element and inner coaxial element of the charging socket, said third element being connected through a high resistance current limiting resistor to a terminal of said voltage source to normally have the same potential as said inner coaxial element, and said third element further being positioned to contact the outer electrode of said chamber when said chamber is inserted in the charging socket to thus connect said third element to the potential of said outer cylindrical element, and a charge indicating device connected in parallel with said cylindrical element and said inner coaxial element to thus indicate the charge of said charging socket, said indicating device also adapted to indicate the distributed charge of both the charging socket and pocket chamber when said chamber is inserted in said socket.

THEODORE A. RICH.
JOHN E. BIGELOW.

REFERENCES CITED

The following references are of record in the file of this patent:

UNITED STATES PATENTS

| Number | Name | Date |
|---|---|---|
| 725,754 | Mosher | Apr. 21, 1903 |
| 2,531,609 | Bulgin | Nov. 28, 1950 |

FOREIGN PATENTS

| Number | Country | Date |
|---|---|---|
| 281,467 | Germany | Jan. 9, 1915 |
| 429,657 | Germany | June 1, 1926 |
| 534,952 | France | Jan. 16, 1922 |